US005481871A

United States Patent [19]

McFadyen

[11] Patent Number: 5,481,871

[45] Date of Patent: Jan. 9, 1996

[54] HYDRAULIC STEERING SYSTEM WITH SPOOL PRESSURE EQUALIZATION

[75] Inventor: Andrew W. McFadyen, Richmond, Canada

[73] Assignee: Teleflex (Canada) Ltd., Richmond, Canada

[21] Appl. No.: 397,357

[22] Filed: Mar. 2, 1995

[51] Int. Cl.$^{6}$ .......... F16D 31/02

[52] U.S. Cl. .......... 60/385; 91/420; 137/106

[58] Field of Search .......... 137/106, 102; 91/420; 60/385

[56] References Cited

U.S. PATENT DOCUMENTS

| | | | |
|---|---|---|---|
| 2,401,258 | 5/1946 | Livers | 137/144 |
| 2,483,312 | 9/1949 | Clay | 277/3 |
| 3,145,734 | 8/1964 | Lee | 137/596.13 |
| 3,386,471 | 6/1968 | King | 91/420 |
| 3,576,192 | 4/1971 | Wood et al. | 137/102 |
| 3,596,566 | 8/1971 | Krehbiel et al. | 91/420 |
| 3,613,508 | 10/1971 | Krehbiel et al. | 91/420 |
| 3,630,218 | 12/1971 | Parrett | 137/106 X |
| 3,908,687 | 9/1975 | Wood et al. | 137/106 |
| 3,933,167 | 1/1976 | Byers, Jr. | 137/106 |
| 4,006,663 | 2/1977 | Baatrup et al. | 91/29 |
| 4,012,031 | 3/1977 | Mitchell et al. | 269/325 |
| 4,192,338 | 3/1980 | Gerulis | 137/106 |
| 4,461,314 | 7/1984 | Kramer | 137/106 |
| 4,669,494 | 6/1987 | McBeth | 137/106 |
| 5,018,935 | 5/1991 | Gage | 414/729 |
| 5,036,750 | 8/1991 | Katayama | 91/464 |
| 5,183,071 | 2/1993 | Ogawa | 137/106 |
| 5,349,818 | 9/1994 | McFadyen et al. | 137/106 X |

FOREIGN PATENT DOCUMENTS

| | | | |
|---|---|---|---|
| 55-94068 | 7/1980 | Japan | 137/106 |

*Primary Examiner*—Stephen M. Hepperle
*Attorney, Agent, or Firm*—Norman M. Cameron

[57] ABSTRACT

A lock valve apparatus and a hydraulic system incorporating a lock valve apparatus including a lock valve body with a bore, a first port, a second port, a third port and a fourth port. There is a spool valve with a valve spool reciprocatingly received in the bore. The spool valve, a first one-way valve and a second one-way valve normally prevent fluid flowing between the ports. The first one-way valve and passageways in the valve permit a fluid flow from the first port to the third port when the first port is pressurized. The second one-way valve and passageways in the spool valve body permit a fluid flow from the second port to the fourth port when the second port is pressurized. The spool valve is shifted to align passageways, including a first annular passageway, between the spool and the bore to permit a return flow of fluid from the fourth port to the second port when the first port is pressurized. The first annular passageway receives pressurized fluid from the fourth port. The spool is shifted to align passageways, including a second annular passageway, between the spool and the bore to permit a return flow of fluid from the third port to the first port when the second port is pressurized. The second annular passageways receives pressurized fluid from the third port.

20 Claims, 5 Drawing Sheets

HYDRAULIC STEERING SYSTEM WITH SPOOL PRESSURE EQUALIZATION

BACKGROUND OF THE INVENTION

1. Field of the Invention

This invention relates to marine hydraulic steering systems and hydraulic lock valves used in conjunction therewith.

2. Description of Related Art

Hydraulic steering systems are preferred on small pleasure and fishing boats instead of the more usual cable steering systems. A problem is encountered however in conventional hydraulic steering systems when they are used on high power boats in particular. Such systems normally include a reversible rotary pump which is mechanically coupled to the steering wheel. Hydraulic lines extend from this manual pump to a hydraulic cylinder attached to the outboard motor or inboard/outboard motor. However a high force is exerted on the cylinder, and consequently on the steering wheel, by the rudder or engine torque. Accordingly, the boater must maintain a hold on the wheel to keep the boat on course.

For these reasons, it is conventional to provide hydraulic steering systems for high powered boats with lock valves. Conventional lock valves are often included in the same housing as the pump connected to the steering wheel, but they could be separate and located in different places such as the back of the boat near the motor. Conventionally these valves include two ports which are connected to the pump and two ports which are connected to the cylinder for two line hydraulic systems. In such systems the two ports on the pump alternate as intake and discharge ports depending upon the direction the steering wheel is turned. The lock valve usually includes an internal spool valve and two check valves or poppet valves. When the wheel is rotated, pressurized fluid from the pump enters one of the ports on the lock valve. The pressurized fluid forces open one of the check valves or poppet valves, thus allowing the fluid to discharge from one of the ports towards the hydraulic cylinder. Hydraulic fluid returning from the other side of the cylinder must reach the intake side of the pump. Normally this flow is blocked by the other check valve. However, the spool valve is shifted by the pressurized fluid from the pump and pushes against the second check valve, opening a return passageway for fluid.

However, there is an inherent problem encountered with conventional hydraulic steering systems including such lock valves. The steering wheels are initially unresponsive and must be turned a considerable amount, often 47°–82° or more depending upon the type of system and equipment, before the rudders or engines respond. Boaters find this a great inconvenience as it does not provide the immediate turning response required for high powered boats such as bass boats. In an effort to do away with the deadband, boaters often resort to hydraulic steering systems without a lock valve at all or to cable steering systems. They prefer the inconvenience of holding the wheel to maintain course, rather than have to deal with an unresponsive steering system with large degrees of deadband.

This problem has been recognized for some time and numerous attempts have been made to minimize the deadband in such hydraulic steering systems. It was thought that the volume of fluid required to move the spool was the source of the problem. Thus much of the effort focused on reducing the movement of the spool valve. Attempts were also made to reduce the spool diameter to cut the volume of fluid flow. Also the check valves were moved closer together so the spool only had to move very small amounts to unseat the check valves. However this did not reduce the deadband significantly and also required close machining tolerances and therefore made the valves expensive.

Another problem encountered with previous lock valves is chatter which occurs when the helm is steered in the same direction the load is acting. The spool in the valve oscillates back and forth, contacting the balls of the check valves and opening and closing the balls under load. The resulting pressure spikes and impact of the spool on the balls and spool stops can cause a disconcertingly loud chattering noise. Steering performance is also diminished.

Earlier U.S. Pat. No. 5,349,878, of which I am a co-inventor, provides some solutions to these problems. However some problems remained. First there is a possibility of hydraulic fluid leaking from the pressurized port in the lock valve circumferentially about the valve spool to the return port. Second, previous arrangements have unequal fluid pressure acting on different portions of the spool at times, resulting in potential spool sticking or uneven operation. Also, previous designs are often prone to fluid leakage past the lands of the valve spool. Also, leakage of fluid about the spool can lead to wheel drift.

SUMMARY OF THE INVENTION

It is therefore an object of the invention to provide an improved marine hydraulic steering system and lock valve without the large amounts of deadband and chatter often encountered in prior art systems employing lock valves and which is responsive to relatively small degrees of rotation of the helm.

It is also an object of the invention to provide an improved marine hydraulic steering system and lock valve which reduce leakage of fluid about the spool of the valve, resulting in reduced steering wheel drift Another object of the invention is to provide an improved marine steering system and lock valve where fluid pressure acting on the spool is equalized about the spool so as to minimize spool lock and result in smoother steering feel and less spool wear.

It is a further object of the invention to provide an improved marine hydraulic steering system and spool valve which are simple in construction, economical to produce and reliable in operation.

In accordance with these objects, one aspect of the invention provides a lock valve apparatus including a lock valve body having a bore therein, a first port, a second port, a third port and a fourth port. There is a spool valve having a valve spool reciprocatingly received in the bore. There is first means in the lock valve body for normally preventing fluid flowing between the ports. There is also second means for permitting a fluid flow from the first port to the third port when the first port is pressurized. Third means permits a fluid flow from the second port to the fourth port when the second port is pressurized. There is fourth means permitting a return flow of fluid from the fourth port to the second port when the first port is pressurized. The fourth means includes an annular passageway between the spool and the bore which can receive pressurized fluid when the spool is centered. There is also fifth means which permits a return flow of fluid from the third port to the first port when the second port is pressurized. The fifth means includes an annular passageway between the spool and the bore which can receive pressurized fluid when the spool is centered.

There is also provided according to another aspect of the invention a hydraulic system including a reversible, manual pump having two pump ports and a lock valve having a lock valve body with a bore, a first port, a second port, a third port and a fourth port. There is a valve spool reciprocatingly received in the bore. There is first means in the lock valve body for normally preventing fluid flowing between the ports. There is second means for permitting a fluid flow from the first port to the third port when the first port is pressurized. Third means permits a fluid flow from the second port to the fourth port when the second port is pressurized. Fourth means permits a return flow of fluid from the fourth port to the second port when the first port is pressurized. The fourth means includes an annular passageway between the spool and the bore which can receive pressurized fluid when the spool is centered. There is also fifth means which permits a return flow of fluid from the third port to the first port when the second port is pressurized. The fifth means includes an annular passageway between the spool and the bore which can receive pressurized fluid when the spool is centered.

Like earlier U.S. Pat. No. 5,349,878, the invention overcomes problems associated with the earlier spool valves and steering systems of the type by allowing a return flow of fluid from the hydraulic cylinder to the steering pump without requiring sufficient pressure on the valve spool to unseat a check valve against the pressure of fluid acting on the return line from the cylinder. Instead, the return line is opened by the simple shifting of the valve spool itself by hydraulic pressure from the discharge port of the pump. The movement of the spool opens a passageway past the spool valve itself for the return flow of fluid to the pump. Thus the degree of pressurization is significantly reduced. In fact, the deadband has been reduced to only 4°–9° in embodiments of the invention. In other words, the deadband has been reduced approximately 90% compared with hydraulic steering systems using a conventional lock valve.

However, some problems remained with the lock valve disclosed in U.S. Pat. No. 5,349,878. In particular, pressurized hydraulic fluid from the return side of the cylinder acted on one side only of the spool. This increases friction between the spool and the bore and can inhibit smooth reciprocation of the spool within the bore. Furthermore, leakage of hydraulic fluid past the spool is accentuated when the spool is pushed to one side, resulting in significant wheel drift.

By comparison, in the present invention, pressurized fluid from the return port always can enter an annular passageway extending between the bore and the spool. Thus the pressurized fluid acts uniformly on the spool, keeping the spool centered with respect to the wall of the bore regardless of its position along the bore. This reduces or eliminates binding of the spool in the bore by keeping the spool centered radially in the bore. Similarly it restricts leakage of fluid past the spool which can result in wheel drift.

DESCRIPTION OF THE PREFERRED EMBODIMENTS

Figure 1:
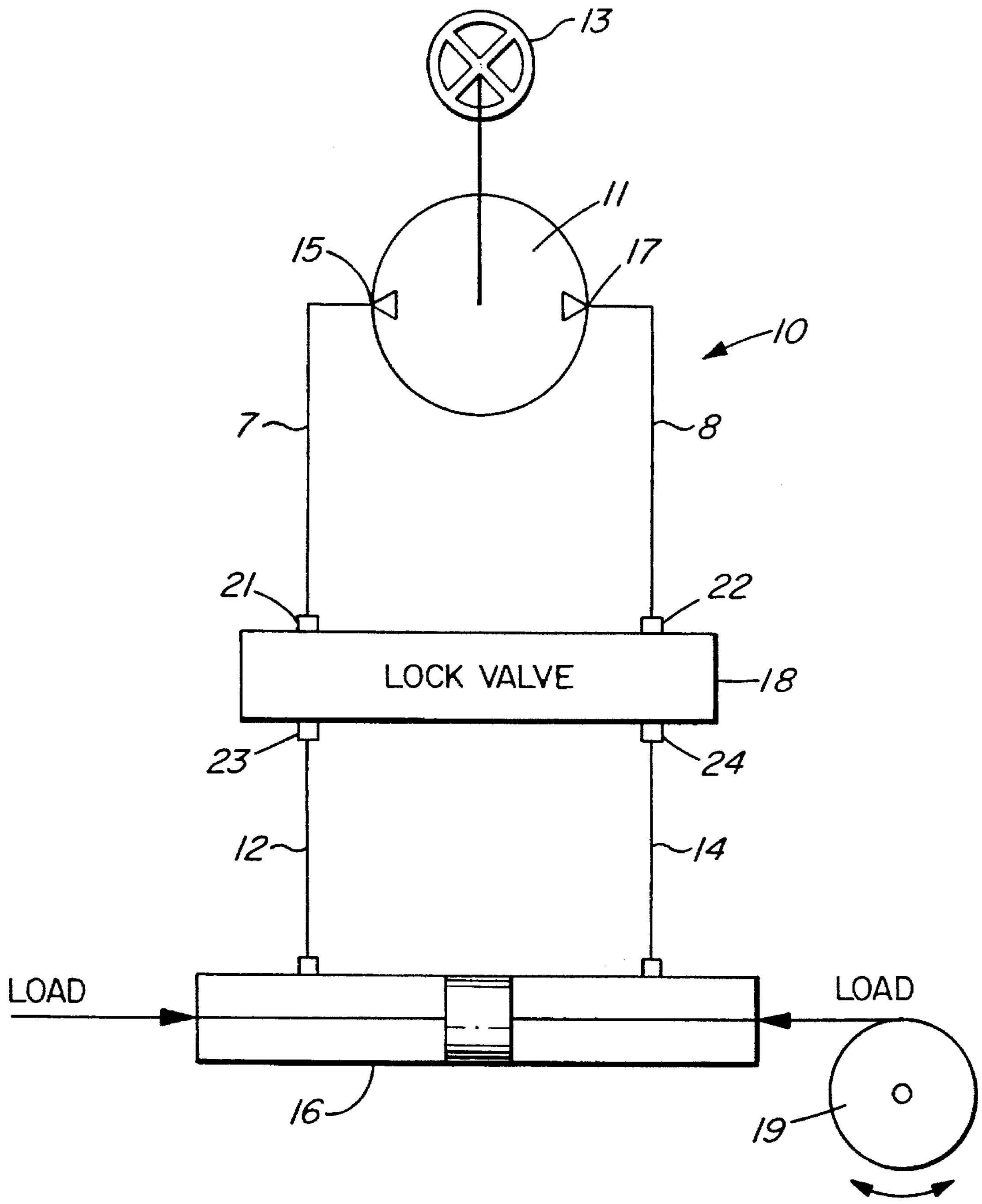
FIG. 1 is a schematic diagram of an hydraulic system according to an embodiment of the invention.

FIG. 1 shows an hydraulic steering system 10 of the type typically used on small pleasure craft and fishing boats. These systems include a rotary pump 11 which is rotated by means of a steering wheel 13. The particular pump 11 shown in FIG. 1 is of the two port type, having ports 15 and 17 which serve as intake ports and discharge ports for hydraulic fluid depending upon the direction the steering wheel 13 is turned. For example, if steering wheel 13 is rotated clockwise, port 17 acts as a discharge port and pumps hydraulic fluid. Port 15 acts as an intake port in this instance. The ports reverse their function when the wheel is rotated counterclockwise.

The ports 15 and 17 are connected to opposite sides of a double acting hydraulic cylinder 16 by hydraulic lines 12 and 14. The cylinder 16 in this example is coupled to an outboard motor 19 and causes the motor to rotate to steer the boat. Alternatively it could be connected to an inboard/outboard motor or to a rudder. There is a lock valve 18 in the system which has a first port 21, a second port 22, a third port 23 and a fourth port 24. The function of lock valve 18 is similar to prior art lock valves. It stops a flow of fluid through hydraulic lines 12 and 14 except when port 21 or port 22 is pressurized according to the direction in which steering wheel 13 is rotated. If the steering wheel is released, then the lock valve prevents a flow of fluid through lines 12 and 14 and hence keeps cylinder 16 and motor 19 in the set position.

Figure 2:
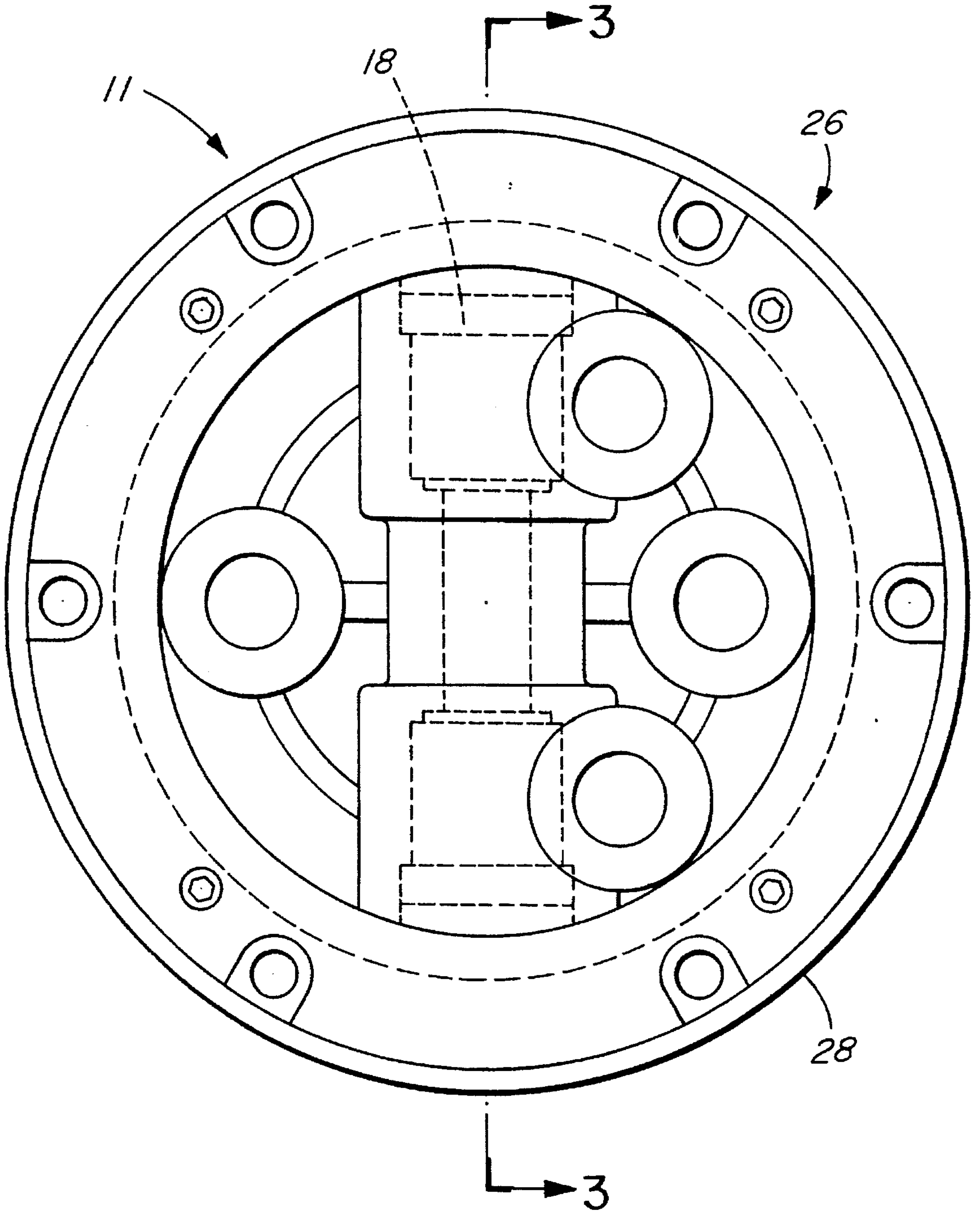
FIG. 2 is a back elevation of the combined steering pump and lock valve thereof.
Figure 3:
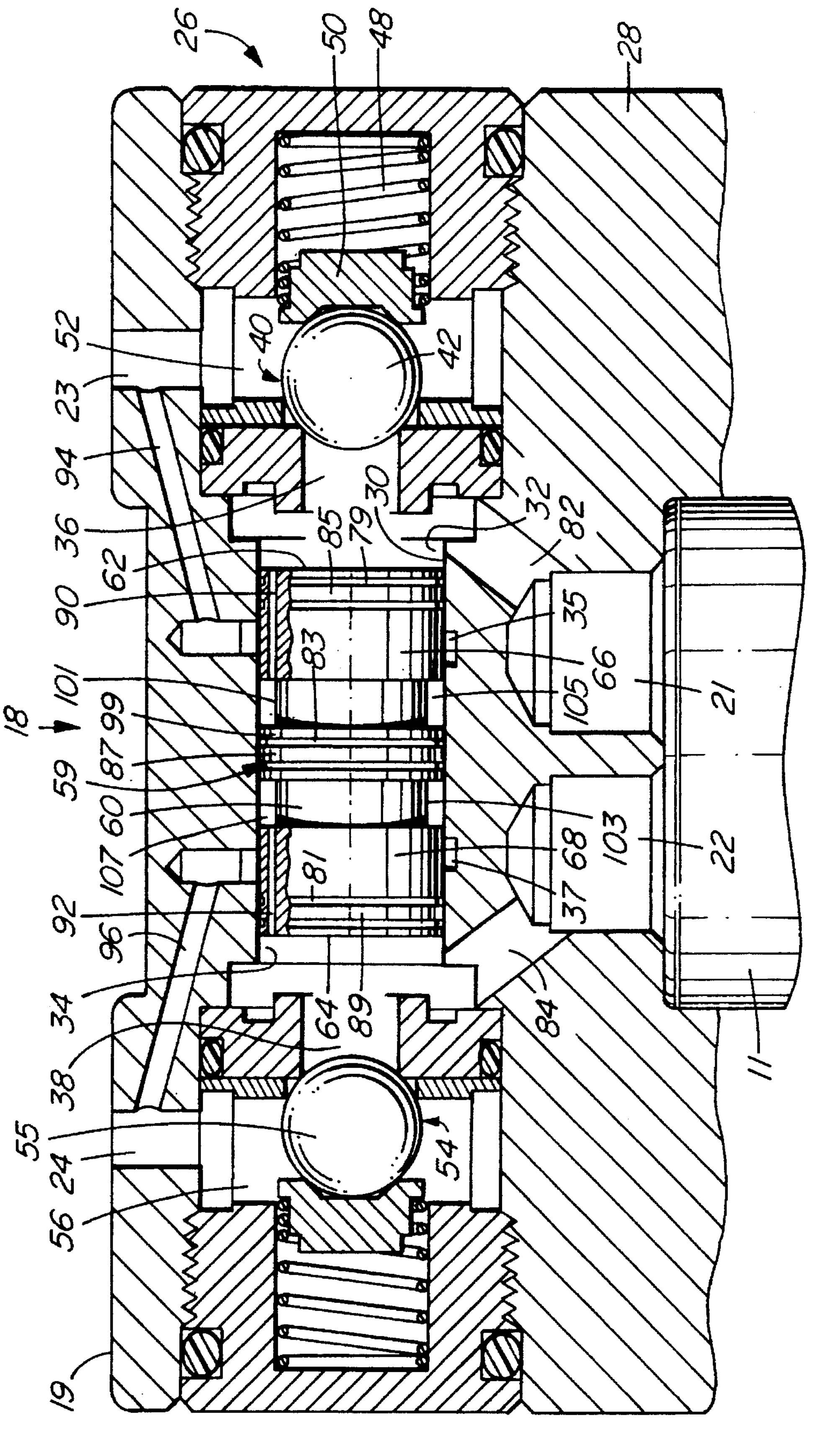
FIG. 3 is a sectional view of a lock valve according to an embodiment of the invention with the spool thereof partly broken away.

Although shown schematically in FIG. 1 as two separate parts, the steering pump 11 and lock valve 18 are combined in a single pump unit 26 in the embodiment shown in FIG. 2 and 3. The unit is in a housing 28. Hydraulic lines 7 and 8 connect ports 15 and 17 of the pump to ports 21 and 22 of the valve respectively.

Referring to FIG. 3, lock valve 18 is physically located in this example within a housing 28 rearwardly of the pump 11 and has a body 19. Ports 21 and 22 are connected through conduits 7 and 8 directly to the pump, while ports 23 and 24 are connected to the cylinder 16 as shown in FIG. 1. There is a cylindrical bore 30 within the housing which has a first end 32 and a second end 34. There are annular passageways 35 and 37 formed by larger diameter portions of the bore generally midway between its ends 32 and 34 and the center thereof in this example. There is a chamber 36 for hydraulic fluid adjacent end 32 and a corresponding chamber 38 adjacent end 34. A first ball-type check valve 40 includes a ball 42 which is resiliently biased towards chamber 36 by a coil spring 48 pressing on a cup fitting 50 which engages the ball. The structure of the check valve is conventional and therefore is not described in more detail. Other types of one-way valves could be employed such as poppet valves.

There is a passageway 52 extending from port 23 to the check valve 40 which communicates with chamber 36 when the check valve is open. It may be observed that the check valve permits fluid to flow from chamber 36 to port 23 when the ball is unseated by pressure in the chamber 36 sufficiently great to overcome the force of spring 48 plus any pressure acting on ball 42 due to pressure in the return line connected to port 23. However, the check valve prevents pressurized fluid at port 23 from forcing the valve open and entering chamber 36. Therefore a fluid flow from port 23 to chamber 36 past the ball valve can only be accomplished in some other manner as described below.

There is another check valve 54 adjacent chamber 38 having a ball 55. The structure is the same as check valve 40. There is a passageway 56 extending from port 24 to the check valve 54. The check valve is opened when there is sufficient pressure in chamber 38 to allow fluid to flow from the chamber to port 24. However, the ball valve cannot be unseated by pressurized fluid at port 24 and therefore acts to prevent fluid from flowing from port 24 to chamber 38 and port 22.

There is a spool valve 59 having a spool 60 reciprocatingly received within the bore 30. The spool has a first end 62 and a second end 64. There is a first end portion or land 66 adjacent end 62 having an outer circumference which slidingly engages the bore 30. There is a second end portion or land 68 adjacent end 64 which also slidingly and sealingly engages the wall of the bore. The spool has a center portion or land 99 which also slidingly engages bore 30. The end portions 66 and 68 and the center portion 99 may have annular seals 85, 89 and 87 respectively within annular grooves 79, 81 and 83. These seals can be O-rings, U-cups, sliding seals or lip material fused onto the spool surface. The seals are not essential but are preferred to reduce fluid leakage past the lands.

The spool 60 has portions or recesses 101 and 103 between the end portions 66 and 68 and the center portion 99 which have smaller diameters than the rest of the spool, thus forming annular passageways 105 and 107 between the spool and bore 30.

The spool also has passageways or ports 90 and 92 which extend through the spool between its ends 62 and 64 and the passageways 105 and 107 respectively. In this example the ports are coaxial with the longitudinal axis of the spool and near its outer edge adjacent bore 30.

There is passageway 94 which extends from port 23 to annular passageway 35. The annular passageway 35 therefore receives pressurized fluid from port 23, when acting as a return port, so the pressure is applied equally about the spool. There is another passageway 96 extending from port 24 to annular passageway 37. The annular passageway 37 therefore receives pressurized fluid from port 24, when acting as a return port, so the pressure is applied equally about the spool.

Operation

The operation of valve 18 and system 10 can be understood by referring to FIG. 1 and 3. When steering wheel 13 is released, and therefore no pressurized fluid is pumped towards ports 21 or 22 of the lock valve from the pump 11, the valve spool 60 is centered with an approximately equal gap between the respective check valves 40 and 54 as seen in FIG. 3. In this position of the valve spool, there can be no fluid flow through the lock valve. The passageways 94 and 96 and annular passageways 35 and 37 are blocked by the end portions 66 and 68 of the valve spool. At the same time, check valve 40 is seated, thus blocking a flow of fluid in either direction between chamber 36 and port 23 past the check valve. Likewise, check valve 54 is seated, thus preventing a flow of fluid between chamber 38 and port 24 past the valve. Because no fluid can flow past the valves, the cylinder 16 shown in FIG. 1 is held in position, thus ensuring that the motor 19 or rudder are kept in position on course without any force being applied to the steering wheel 13.

When the steering wheel 13 is turned, pressurized fluid is pumped from pump 11, for example out of port 15. This provides pressurized fluid at port 21 of the lock valve 18. Chamber 36 is pressurized through passageway 82 and this tends to unseat ball 42 so fluid flows towards port 23. However, this flow of fluid from port 23 to the left side of cylinder 16 from the point of view of FIG. 1, cannot commence until a return flow of fluid can pass through the lock valve 18 from port 24 to port 22. In some prior art lock valves of this general type, this was accomplished by the pressurized fluid in chamber 36 thus acting on first end 62 of the valve spool 60, thus pushing the spool against ball 55 of check valve 54. The fluid pressure in chamber 36 thus had to be sufficient to force ball 55 open against the pressure of fluid acting in the opposite direction on the ball valve from port 24. As discussed above, this fact largely contributed to the deadband encountered in prior art steering systems of the type.

However, in the new lock valve 18, a return flow of fluid from port 24 to port 22 does not depend upon the valve spool forcing open check valve 54. Instead, passageway 96 from port 24 can communicate with passageway 84 extending to port 22 when the valve spool 60 is moved towards chamber 38 by pressurized fluid in chamber 36. When this occurs, the right end, from the point of view of FIG. 3, of port 92 communicates with annular passageway 37 through passageway 107. Therefore return fluid from the right side of cylinder 16, from the point of view of FIG. 1, can enter port 24, pass through passageways 96, 37, 107, port 92, chamber 38 and passageway 84 to re-enter the pump at port 17 shown in FIG. 1. Then the fluid is free to pass through the lock valve in both directions.

When the boat is steered in the opposite direction, fluid is discharged from pump 11 through port 17 and enters the lock valve through port 22. Chamber 38 is pressurized by fluid entering the chamber through passageway 84. This has the effect of shifting the valve spool towards check valve 40. Passageway 105 about the valve spool then becomes aligned with annular passageway 35 and passageway 94, allowing return fluid from the left side of the cylinder, from the point of view of FIG. 1, to pass around the check valve via port 23, passageway 94, annular passageway 35, passageway 105, port 90, chamber 36 and passageway 82.

Variations and Alternatives

Figure 4:
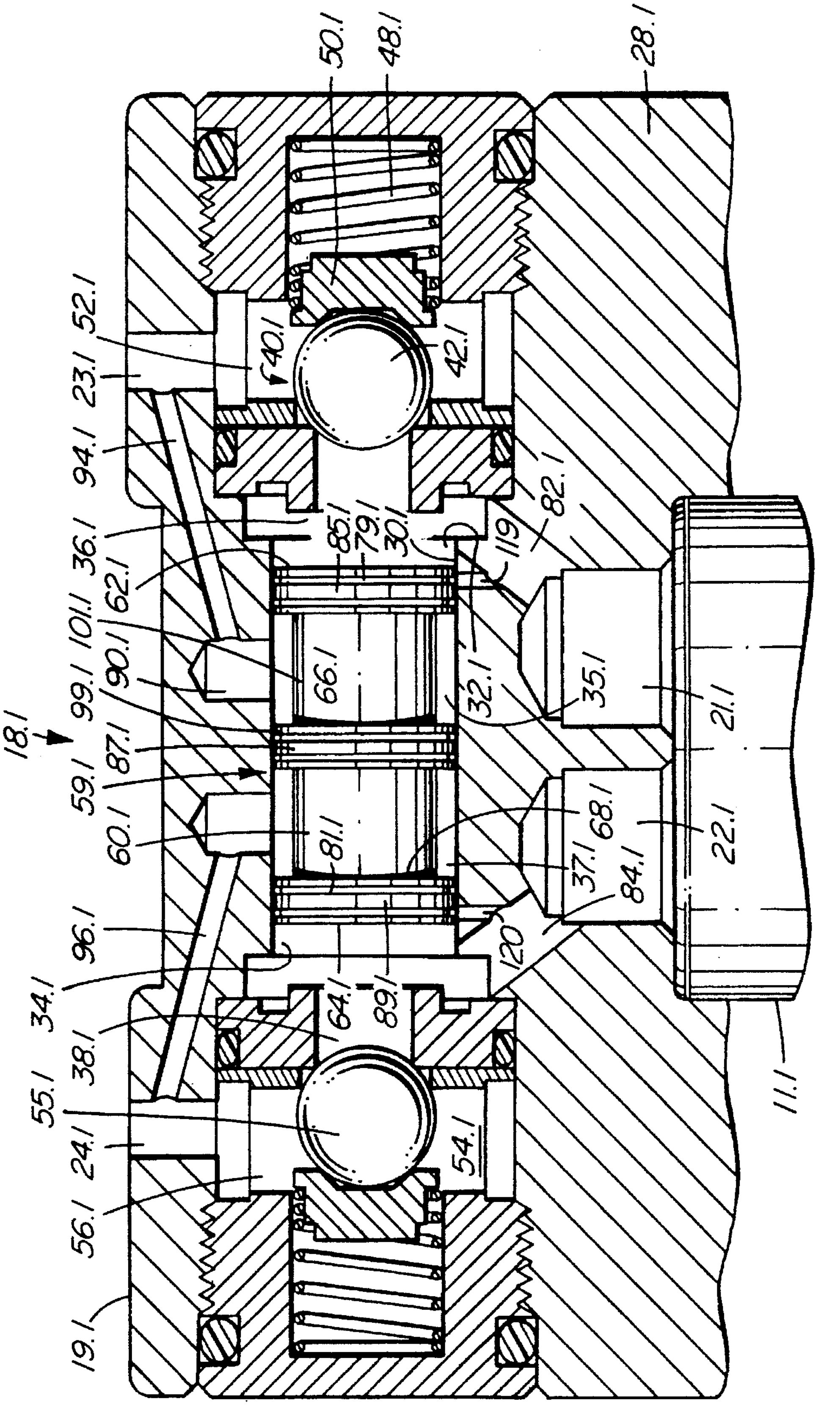
FIG. 4 is a sectional view, similar to FIG. 3, of a lock valve according to another embodiment of the invention.

Refer to FIG. 4, this shows a variation of the lock valve of FIG. 3. Like parts have like numbers with "0.1" added. Valve 18.1 is shown integral with housing 28.1 in a view equivalent to section 3—3 in FIG. 2. The valve 18.1 is generally the same as valve 18 and thus will be described only with respect to the differences therebetween. One significant difference is that the annular passageways 35.1 and 37.1 are formed by annular grooves or recesses in spool 60.1 instead of the inside of the bore as in the previous embodiment. These replace the passageways 105 and 107 of the previous embodiment. As well, there are no ports 90 and 92 extending axially through the spool. The return hydraulic fluid entering port 94.1 enters the annular passageway 35.1 when the spool is centered as shown in FIG. 4. Likewise, when the wheel is turned in the opposite direction, pressurized return fluid from passageway 96.1 communicates with annular passageway 37.1. Again therefore the pressurized fluid from the return port acts completely about the valve spool, keeping it centered with respect to the annular wall of the bore throughout its range of travel along the bore.

There are offset passageways 119 and 120 which extend from bore 30.1 to the ports 21.1 and 22.1 respectively. These passageways are adjacent the chambers 36.1 and 38.1 and are offset outwardly with respect to ports 94.1 and 96.1.

When pressurized fluid from port 22.1 enters chamber 38.1, it shifts the valve spool to the right, from the point of view of FIG. 4, so annular passageway 35.1 communicates with passageway 119. Thus return fluid from passageway 94.1 can enter the annular passageway 35.1, and then pass through passageway 119 to port 21.1. When the wheel is turned in the opposite direction, the spool is shifted to the left from the point of view of FIG. 4 so annular passageway 37.1 communicates with passageway 120. The return fluid from passageway 96.1 enters annular passageway 37.1 and then passes through passageway 120 to port 22.1. Otherwise, the valve 18.1 is similar to valve 18 above.

Figure 5:
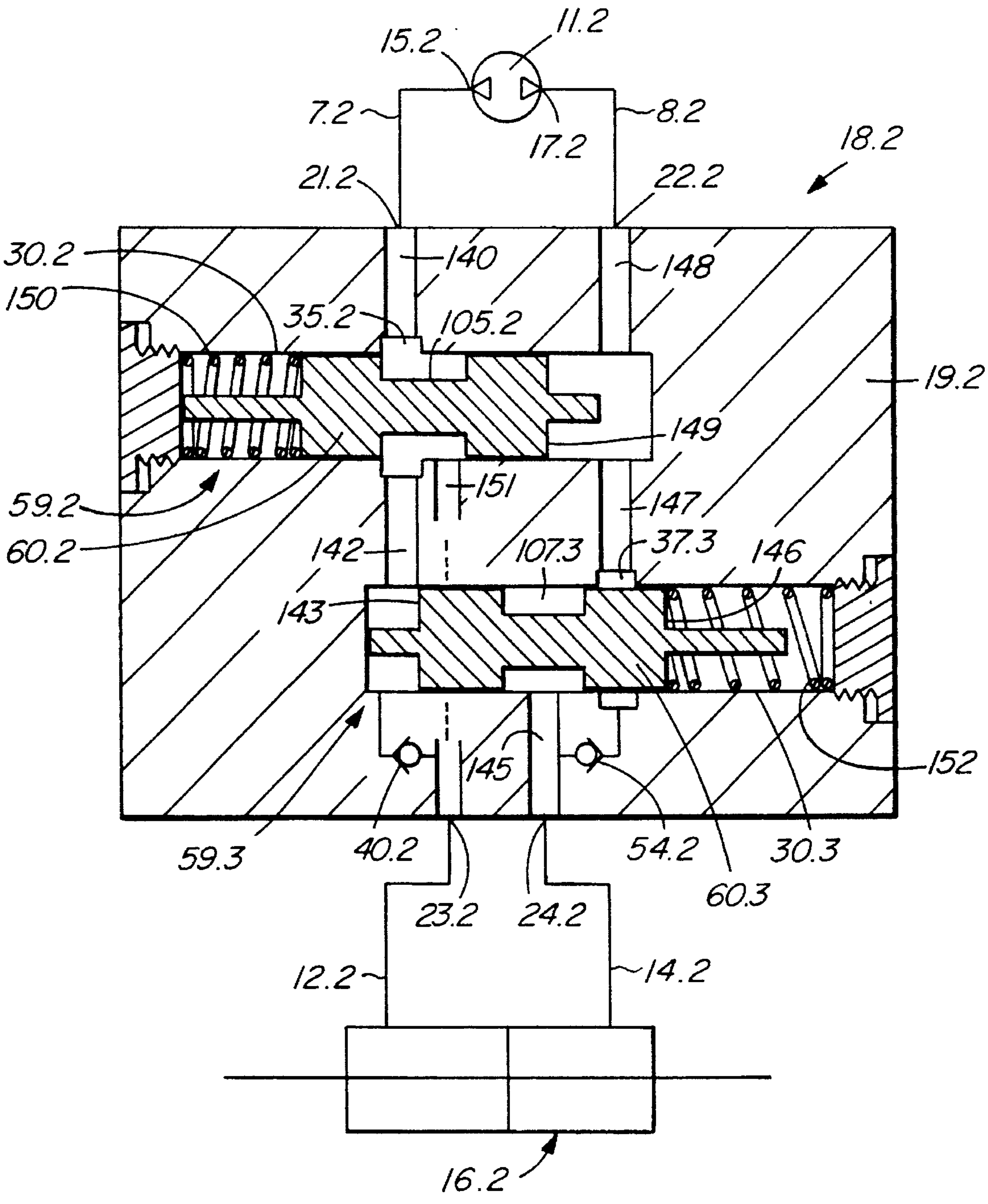
FIG. 5 is a schematic diagram of a lock valve according to a further embodiment of the invention.

Referring to FIG. 5, this shows another variation of the invention shown in FIG. 3 where like parts have like numbers with the addition of "0.2" or "0.3". In this particular example body 19.2 of valve 18.2 has two separate spools 60.2 and 60.3. Annular passageway 35.2 in this example is in bore 30.2, while annular passageway 37.3 is in bore 30.3. Pressurized fluid entering body 19.2 through port 21.2 passes through a passageway 140 to bore 30.2 where it enters annular passageway 35.2. The fluid then can pass through passageway 142 to enter bore 30.3 at end 143 of spool 60.3. This shifts the spool 60.3 to the right from the point of view of FIG. 5. The pressurized fluid opens check valve 40.2 and exits through port 23.2 to the cylinder 16.2 The return fluid from the cylinder enters through port 24.2 where it enters passageway 107.3 about the spool 60.3.

As stated above, the spool has been shifted to the right, so that fluid can pass from passageway 107.3 into annular passageway 37.3. The fluid then can pass to bore 30.2 through passageway 147 and subsequently to port 22.2 through passageway 148.

When port 22.2 is pressurized by pump 11.2, the fluid can enter bore 30.2 through passageway 148. It can then act on end 149 of spool 60.2 to shift the spool to the left from the point of view of the drawing. The fluid can then flow through passageway 147 into annular passageway 37.3 to force open check valve 54.2 and reach port 24.2 through passageway 145. The return fluid enters through port 23.2 and reaches bore 30.2 through passageway 151 which bypasses spool 30.3. Spool 60.2 is illustrated shifted to the left where passageway 105.2 communicates with annular passageway 35.2 to allow the fluid to reach passageway 140 and port 21.2.

It will be understood by someone skilled in the art that many of the details described above are by way of example only and can be altered or deleted without departing from the scope of the invention which is to be interpreted with reference to the following claims.

What is claimed:

1. A lock valve apparatus, comprising a lock valve body (19, 19.1, 19.2) having a bore (30, 30.1, 30.2, 30.3) therein, a first port (21, 21.1, 21.2), a second port (22, 22.1, 22.2), a third port (23, 23.1 23.2) and a fourth port (24, 24.1, 24.2);

a spool valve (59, 59.1, 59.2, 59.3) having a spool (60, 60.1, 60.2, 60.3) reciprocatingly received in the bore;

first means (60, 40, 54, 60.1, 40.1, 54.1, 60.2, 40.2, 54.2, 60.3) in the lock valve body for normally preventing fluid flowing between the ports;

second means (82, 36, 40, 52, 82.1, 36.1, 40.1, 52.1, 140, 35.2, 142, 30.3, 40.2, 151) for permitting a fluid flow from the first port to the third port when the first port is pressurized;

third means (84, 38, 54, 56, 84.1, 38.1, 54.1, 56.1, 148, 30.2, 147, 37.3, 54.2, 145) for permitting a fluid flow from the second port to the fourth port when the second port is pressurized;

fourth means (96, 37, 107, 92, 38, 84, 96.1, 37.1, 120, 145, 107.3, 37.3, 147, 30.2, 148) for permitting a return flow of fluid from the fourth port to the second port when the first port is pressurized, the fourth means including a first passageway (37, 37.1, 37.3) between the spool and the bore which extends about the spool and which can receive pressurized fluid from the fourth port;

fifth means (904, 37, 105, 90, 36, 82, 94.1, 35.1, 119, 151, 105.2, 35.2, 140) for permitting a return flow of fluid from the third port to the first port when the second port is pressurized, the fifth means including a second annular passageway (35, 35.1, 35.2)

between the spool and the bore which extends completely about the spool and which can receive pressurized fluid from the third port.

2. A lock valve apparatus as claimed in claim 1, wherein the passageways between the spool and the bore (35, 37, 35.1, 37.1, 35.2, 37.3) are annular passageways.

3. A lock valve apparatus as claimed in claim 1, wherein the passageways (35, 37, 35.1, 37.1, 35.2, 37.3) can receive pressurized fluid from the fourth port and the third port respectively when the spool is axially centered in the bore.

4. A lock valve apparatus as claimed in claim 2, wherein the passageways (35, 37, 35.2, 37.3) between the spool and the bore are formed in the bore about the spool.

5. An apparatus as claimed in claim 4, wherein the spool has a pair of spaced-apart recesses (101, 103) with a center land (87) therebetween which sealingly and slidingly contacts the bore and forming passageways (105, 107) which are parts of the fifth means and the fourth means respectively.

6. An apparatus as claimed in claim 5, wherein the spool has passageways (90, 92) extending through the spool from the recesses (101, 103) to opposite ends (62, 64) of the spool which are parts of the fifth means and the fourth means respectively.

7. An apparatus as claimed in claim 5, wherein the spool has end lands (66, 68) between the recesses (101, 103) and opposite ends (62, 64) of the spool which slidingly and sealingly contact the bore.

8. An apparatus as claimed in claim 7, wherein there are annular seals (79, 87, 89) on said lands.

9. An apparatus as claimed in claim 7, wherein the seals (85, 89) on the end lands are adjacent the ends (62, 64) of the spool.

10. An apparatus as claimed in claim 1, wherein the first port and the second port communicate with the bore (30) only through passageways (82, 84) which extend beyond the ends of the spool.

11. An apparatus as claimed in claim 2, wherein the annular passageways (35.1, 37.1) are recesses on the spool, the spool having a center land (87.1) between the annular passageways and end lands (66.1, 68.1 ) between the annular passageways and opposite ends (62.1, 64.1) of the spool.

12. An apparatus as claimed in claim 11, wherein the first and second ports (21.1, 22.1 ) communicate with the bore (30.1) through return passageways (119, 120) which are blocked by the end lands (66.1, 68.1 ) when the spool is centered.

13. An apparatus as claimed in claim 12, wherein one of the annular passageways (35.1, 37.1) communicates with one of the return passageways (119, 120) when the spool is shifted by pressurized fluid at the first or second ports (21.1, 22.1 ).

14. An apparatus as claimed in claim 13, wherein the annular passageways communicate with passageways (94.1, 96.1) extending from the bore (30.1) to the third and fourth ports (23.1, 24.1)respectively when the spool is centered and when the spool is shifted towards either end thereof.

15. An apparatus as claimed in claim 2, wherein the apparatus has two bores (30.2, 30.3) with two spools (60.2, 60.3) reciprocatingly received therein, a first said annular passageway (35.2) being between a first said bore (30.2) and a first said spool (60.2), a second said annular passageway (37.3) being between a second said bore (30.3) and a second said spool (60.3).

16. An apparatus as claimed in claim 1, wherein the first means and the second means include one-way valves (40, 54, 40.1, 54.1, 40.2, 54.2).

17. An apparatus as claimed in claim 1, wherein the fourth means and the fifth means include passageways in the body of the lock*valve and passageways between the spool and the bore which are aligned when the valve spool is shifted by pressurized fluid entering the body through the first port or the second port thereof.

18. An apparatus as claimed in claim 2, wherein the first annular passageway can receive pressurized fluid from the fourth port when the spool is displaced towards a first end of the bore and the second annular passageway can receive pressurized fluid from the third port when the spool is displaced towards a second end of the bore.

19. A hydraulic system, comprising:

a reversible manual pump (11, 11.2) having two pump ports (15, 17, 15.2, 17.2);

a fluid actuator (16, 16.2);

a lock valve (18, 18.1, 18.2) having a body (19, 19.1, 19.2) with a bore (30, 30.1, 30.2, 30.3) therein, a first port (21, 21.1, 21.2), a second port (22, 22.1, 22.2) a third (23, 23.1, 23.2) and a fourth port (24, 24.1, 24.2), a valve spool (59, 59.1, 59.2, 59.3) having a valve spool (60, 60.1, 60.2, 60.3) reciprocatingly received in the bore, first means (60, 40, 54, 60.1, 40.1, 54.1, 60.2, 60.3, 40.2, 54.2) in the lock valve body for normally preventing fluid flowing between the ports, second means (40, 82, 36, 52, 82.1, 36.1, 40.1, 52.1, 140, 35.2, 105.2, 142, 30.3, 40.2, 151) for permitting a flow of fluid from the first port to the third port when the first port is pressurized, third means (54, 84, 38, 56, 84.1, 54.1, 56.1, 148, 30.2, 147, 37.3, 54.2, 145) for permitting a flow of fluid from the second port to the fourth port when the second port is pressurized, fourth means (96, 37, 107, 92, 38, 84, 96.1, 37.1, 120, 145, 107.3, 37.3, 147, 30.2, 148) for permitting a return flow of fluid from the fourth port to the second port when the first port is pressurized, the fourth means including an annular passageway (37, 37.1, 37.3) between the spool and the bore which can receive pressurized fluid from the fourth port, and fifth means (94, 35, 105, 90, 36, 82, 94.1, 35.1, 119, 151, 105.2, 35.2, 140) for permitting a return flow of fluid from the third port to the first port when the second port is pressurized, the fifth means including an annular passageway (35, 35.1, 35.2) between the spool and the bore which can receive pressurized fluid from the third port;

hydraulic conduits (7, 8, 7.2, 8.2) connecting the pump ports (15, 17, 15.2, 17.2) to the first and second ports (21, 22, 21.2, 22.2) respectively; and hydraulic conduits (12, 14, 12.2, 14.2) connecting the cylinder (16, 16.2) to the third and fourth ports (23, 24, 23.2, 24.2) respectively.

20. A hydraulic system as claimed in claim 19, wherein the annular passageways can receive pressurized fluid from the fourth port and the third port respectively when the spool is axially centered along the bore and when the spool is shifted towards either end thereof.

* * * * *